United States Patent [19]

Rice et al.

[11] Patent Number: 5,801,516

[45] Date of Patent: Sep. 1, 1998

[54] DRIVE OVERLOAD PROTECTION CIRCUIT

[75] Inventors: Kevin E. Rice, Stow; Ronald W. Roseman, Walton Hills; Charles A. Green, Cleveland Heights; Dean A. Snider, Twinsburg, all of Ohio

[73] Assignee: Lucas Aerospace Power Equipment Corp., Aurora, Ohio

[21] Appl. No.: 866,763

[22] Filed: May 30, 1997

Related U.S. Application Data

[62] Division of Ser. No. 742,855, Nov. 1, 1996, which is a division of Ser. No. 131,196, Oct. 1, 1993, Pat. No. 5,583,420.

[51] Int. Cl.$^6$ .................................................. H02P 9/10
[52] U.S. Cl. ............................. 322/37; 322/25; 322/27; 322/18
[58] Field of Search ............................. 322/18, 19, 22, 322/25, 27, 28, 37; 361/20, 101

[56] References Cited

U.S. PATENT DOCUMENTS

| | | | |
|---|---|---|---|
| 4,335,344 | 6/1982 | Gant | 322/25 |
| 4,354,182 | 10/1982 | Frey | 340/650 |
| 4,496,897 | 1/1985 | Unnewehr et al. | 322/25 |
| 4,631,628 | 12/1986 | Kissel | 361/154 |
| 4,672,502 | 6/1987 | Reichart | 361/101 |
| 4,849,683 | 7/1989 | Flolid | 323/284 |
| 5,051,670 | 9/1991 | De Piola | 318/434 |
| 5,140,253 | 8/1992 | Itoh | 322/28 |
| 5,168,208 | 12/1992 | Schultz et al. | 322/25 |
| 5,488,532 | 1/1996 | Mrowiec et al. | 361/63 |
| 5,508,601 | 4/1996 | Good et al. | 322/37 |
| 5,550,456 | 8/1996 | Shekhawat et al. | 322/25 |
| 5,583,420 | 12/1996 | Rice et al. | 322/25 |
| 5,617,011 | 4/1997 | Hammer et al. | 322/28 |
| 5,663,632 | 9/1997 | Roseman et al. | 322/59 |

FOREIGN PATENT DOCUMENTS

| | | |
|---|---|---|
| 0008509 | 3/1980 | European Pat. Off. . |
| 0008509 | 5/1980 | European Pat. Off. . |
| 0272946 | 6/1988 | European Pat. Off. . |
| 1166357 | 10/1969 | United Kingdom . |
| 1601197 | 10/1981 | United Kingdom . |
| 2127186 | 9/1983 | United Kingdom . |
| 2127186 | 4/1984 | United Kingdom . |
| 2145545 | 3/1985 | United Kingdom . |
| 2172416 | 9/1986 | United Kingdom . |

OTHER PUBLICATIONS

British Patent Office Search Report dated Jan. 8, 1997.

*Primary Examiner*—Steven L. Stephan
*Assistant Examiner*—Nicholas Ponomarenko
*Attorney, Agent, or Firm*—Rankin, Hill, Porter & Clark LLP

[57] ABSTRACT

A controller for a starter/generator used with an aircraft engine, includes means for monitoring field return current in a generator field winding; means for monitoring generator voltage; and microprocessor control means for adjusting generator field current as a function of the field current and voltage and field return current. The field return current and output voltage monitoring functions allow for open field, field integrity, over voltage, field weakening and torque limiting functions to be realized in an integrated programmable system configuration.

18 Claims, 9 Drawing Sheets

DRIVE OVERLOAD PROTECTION CIRCUIT

This is a divisional of application Ser. No. 08/742,855 filed on Nov. 1, 1996 which is a divisional of Ser. No. 08/131,196 filed Oct. 1, 1993 which issued as U.S. Pat. No. 5,583,420.

BACKGROUND OF THE INVENTION

The invention relates to controllers for generators, such as are used with aircraft engine starters and generators.

It is well known to use generators as starters for motors and engines. For example, in the aerospace industry, DC generators are commonly used as engine starters on small aircraft engines such as gas turbine engines. After the engine is started, the generator typically is used as an electrical power source for the aircraft.

Aircraft manufacturers and governmental regulations have, over the years, gradually increased the demand for more monitoring and control functions to be implemented for these generators, particularly with respect to providing fast and accurate indications of fault conditions to avoid catastrophic generator failures and engine damage. However, space and weight considerations can limit the availability and use of multiple discrete logic circuits. Discrete control circuits also inherently lack central processing control, thus limiting the number of interdependent control functions that can be implemented.

Furthermore, various control and monitoring functions heretofore used with generator discrete controllers can be inadequate or unsuitable for protecting components that can be overstressed or for facilitating acceptable generator operation. For example, linear current limiters for devices subject to current overloads can exhibit large power dissipation, and known switch mode current limiters can deliver excessive currents and therefore not adequately protect interconnect wiring. As another example, it may be desirable in some applications to provide an automatic field flash for the generator without the need for manual pilot control.

The need exists, therefore, for a generator controller that can implement numerous and complex control and monitoring functions to facilitate proper generator operation without a significant increase in cost, space requirements or weight with an increased reliability of generator operation and control.

SUMMARY OF THE INVENTION

In view of the aforementioned needs, the invention contemplates, in one embodiment, a controller for a starter/generator used with an engine, comprising means for monitoring field free wheeling current in a generator field winding; means for monitoring generator voltage and current; and microprocessor control means for controlling generator field current as a function of said monitored generator current, generator voltage and field current.

The invention further contemplates the methods embodied in the operation of such apparatus, as well as a method for detecting field integrity in a generator comprising the steps of:

a. monitoring field free wheeling current in the generator using a rectifier in shunt with the generator field winding; and b. de-energizing the generator when field free wheeling current is absent during a time period when field free wheeling current should be present.

In another embodiment, the invention contemplates a switching driver overload protection circuit comprising means for controlling current through the device, and a relaxation oscillator for decreasing said current in response to increasing load.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1A:
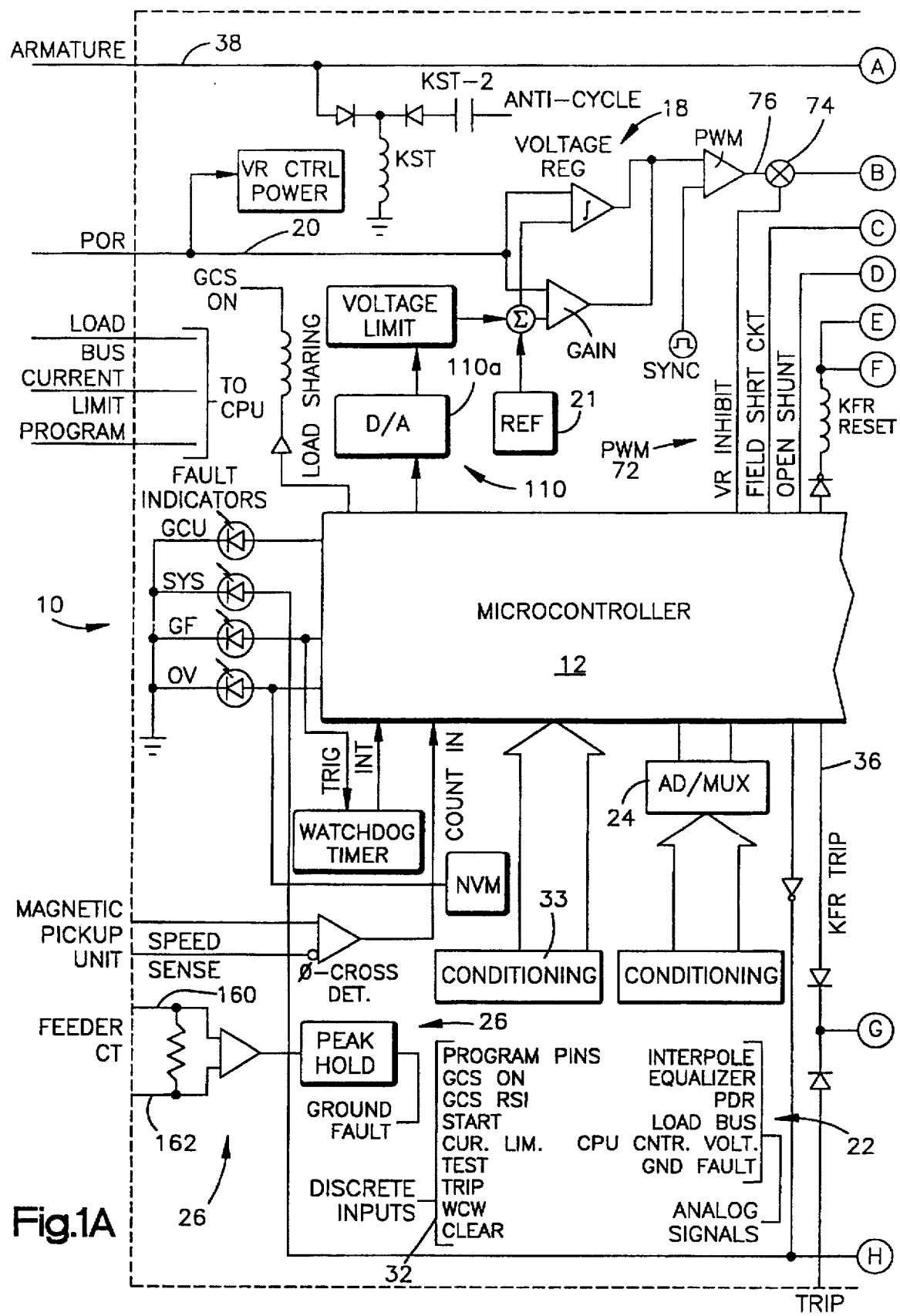
FIGS. 1A and 1B is a system level functional block diagram of a generator control circuit according to the present invention.
Figure 1B:
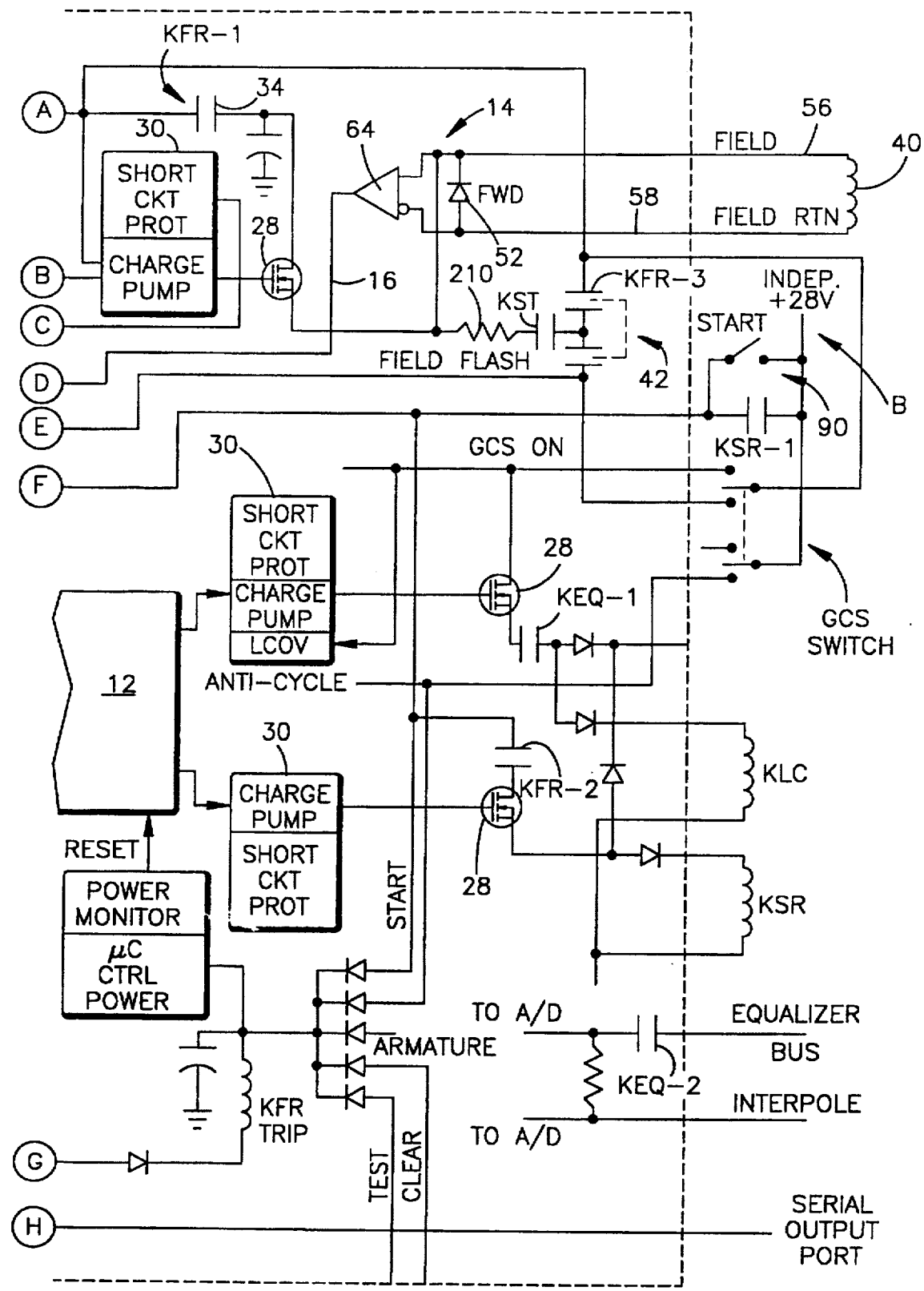

With reference to FIG. 1, a microprocessor based controller apparatus for a generator is generally designated with the numeral 10. Although the invention is described herein with particular reference to a DC shunt generator such as can be used conveniently as a starter/generator for an aircraft engine, this is for purposes of explanation and should not be construed in a limiting sense. Those skilled in the art will readily appreciate that the teachings of the present invention can be applied in AC generators, for example Thus, rather than being application specific, the invention is more broadly construed as being directed to monitoring and control apparatus and methods for generators. As used herein, the term "starter/generator" simply refers to the fact that a generator such as described herein can be used as a starter for an engine, and after engine start can be used as a power plant for the aircraft. However, reference to the use of a controller according to the invention with such a starter/generator is not intended to be limited only to generators used as starters.

In accordance with an important aspect of the invention, the generator controller 10 is designed for the use of a microprocessor-based controller or programmable microcontroller 12. The use of a microcontroller significantly increases the number of monitoring and control functions that can be integrated into the controller 10. This increased flexibility permits monitoring and control functions in accordance with the invention that heretofore were not used with known generator controllers, and particularly for starter/generators used with aircraft engines. The monitoring and control functions as taught herein thus facilitate the use of a microcontroller for aircraft starter/generators, for example, where otherwise the benefits of such use of a microcontroller would not be apparent. As will be understood from the detailed description herein, however, some of the teachings of the present invention also have general application to generator controllers that are not microprocessor based, although their use with a microprocessor-based controller enhances their advantages.

With continued reference then to FIG. 1, the controller apparatus 10 includes the microcontroller 12 that receives a plurality of input signals from various monitoring circuits and issues control signals to these circuits and other control devices to regulate and control operation of the generator. The microcontroller can be any suitable microprocessor-based device such as part number 87C51 available from Intel. This device can be programmed in a conventional manner according to the manufacturer's specifications to implement the control functions as described herein and/or set forth in the accompanying flow diagrams, as is well known to those skilled in the art. Peripheral components such as ROM and RAM memories, clock generators and so on which are inherently used in combination with a microprocessor form no particular part of the invention and thus have been omitted from the drawings for clarity and understanding.

Among the monitoring circuits shown in FIG. 1 is a field current integrity circuit 14 that provides means for detecting the presence or absence of a field winding current. The field integrity circuit 14 produces an output 16 which in this case indicates the presence or absence of a field return current. The field return output signal 16 is provided as an input to the microcontroller for use as will be more fully described hereinafter.

Another circuit that interfaces with the microcontroller 12 is a voltage regulator circuit 18. The voltage regulator circuit 18 is conventional in design and, in accordance with the invention, can operate independent of the microcontroller 12 in the event that the microcontroller fails. However, in further accordance with the invention, the microcontroller is programmed to implement a start-up and control function as described herein via an interface to the regulator circuit 18.

In further accordance with the invention, the microcontroller receives as an input a digitized representation of the regulated generator output voltage, hereinafter referred to as the point of regulation or POR 20. The POR may be connected to the armature through a feeder cable. As shown at 22 in FIG. 1, the POR analog value is input to a conventional analog to digital converter 24 that can receive a plurality of analog inputs 22 in a time multiplexed manner.

The digitized POR value is input to the microcontroller 12. As will be described herein, the microcontroller 12 uses the POR information in combination with the field integrity signal 16 to implement an overvoltage protection function that responds more quickly to overvoltage conditions than heretofore known designs.

Still a further monitoring function of the controller 10 in accordance with the invention is a ground fault detection circuit 26. The ground fault circuit 26 can be used as a stand alone circuit in control circuits that do not use a microcontroller. However, a particular advantage of the ground fault circuit 26 is that it provides an output format that can conveniently be used to implement a built in test that the microcontroller can use to verify proper operation of the circuit.

The invention further contemplates the methods embodied in the use of such circuits in combination with the microcontroller, as will be apparent from the descriptions herein.

The generator control unit apparatus 10 further includes a number of switching transistors 28, that are used for controlling operation of the generator. The numeral 28' is used to designate the field transistor that is used to control the field current supplied by the armature in a shunt type generator. These switching devices (the devices 28 and 28' can be the same device or different devices) are susceptible to overload conditions that can damage and degrade the devices over time or cause sudden device failure. In accordance with the invention, these driver devices are protected with an overload or short circuit protection circuit 30. Operation of these circuits are not dependent on the use of a microcontroller; but, if desired, the microcontroller can be used to monitor the device output status and de-energize the device as appropriate.

The microcontroller 12 also receives a plurality of digital signals 32 from discrete logic circuits. The digital signals are typically input to conditioning circuits 33 of conventional design to transform the signals into a format compatible for input to the microcontroller. These digital input signals provide information to the microcontroller such as relay status that the microcontroller uses to determine if conditions exist that require de-energizing the generator or other control action as appropriate. These digital monitor and control functions form no particular part of the present invention because they tend to be somewhat design specific and are largely a matter of design choice, other than to the extent that the use of the microcontroller, facilitated by the monitor and control functions of the present invention, also conveniently permits these digital signals to be used by the same control program without increased circuit complexity.

The microcontroller 12 controls overall operation of the generator through a number of relays. For purposes of this embodiment of the invention, the controller 10 includes a latching field relay designated KFR in the drawings. The field relay includes a first set of contacts 34 (KFR-1) that can be opened by the microcontroller 12 by actuation of a relay trip signal 36. These contacts when open interrupt the shunt circuit between the generator armature winding 38 and the field winding 40, thus protecting the generator and regulator 18 by shutting down the field current. The field relay includes another set of contacts 42 that are closed when the KFR is tripped. A non-latching relay designated KST with normally closed contacts is used for field flash and is energized when armature voltage is present.

In general terms, the basic functions of the controller 10 include fault detection for field current, ground fault and generator overvoltage conditions, as well as controlling field current during and after engine start. These functions are explained in greater detail in the following descriptions of the detailed exemplary embodiments of the monitoring and control circuits. As described hereinbefore, these circuits and methods facilitate the use of a microcontroller with a starter/generator such as used for aircraft engines.

Figure 2:
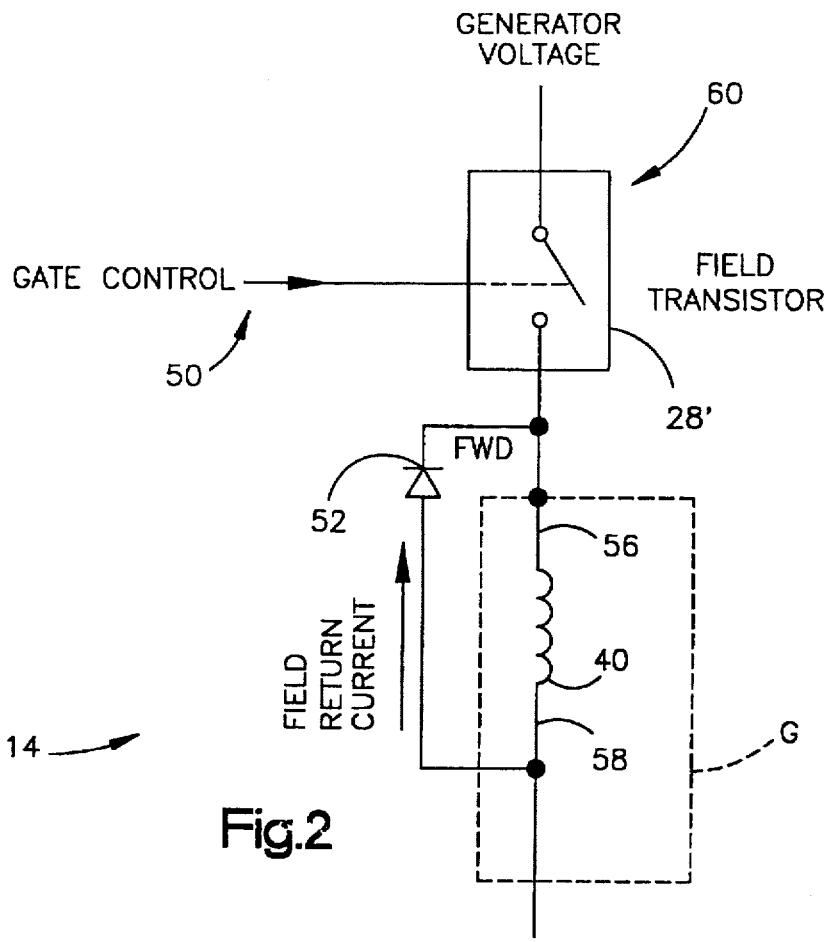
FIG. 2 is a more detailed schematic diagram of a field integrity monitor circuit suitable for use with the control circuit of FIG. 1.
Figure 3:
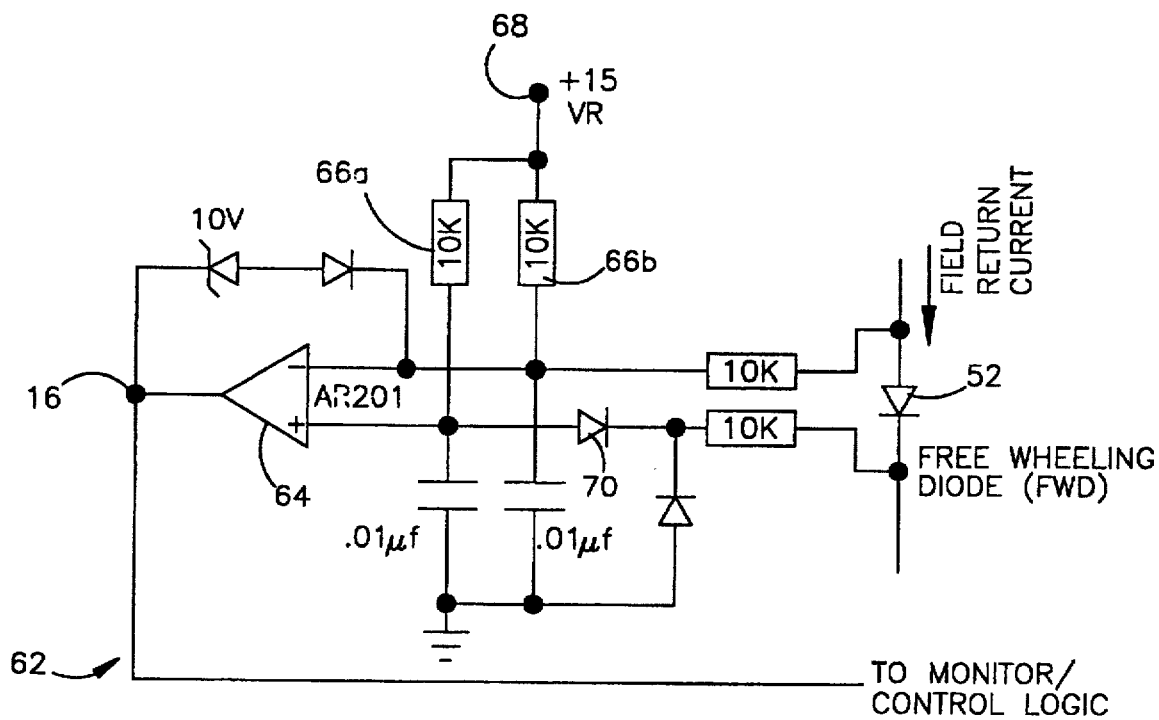
FIG. 3 is a detailed schematic diagram of a field integrity signal conditioning circuit used with the field integrity monitor circuit of FIG. 2.

With reference next to FIGS. 2 and 3, we show an embodiment of a circuit 14 for monitoring field integrity. It is noted at this time that the generator G is not shown in detail in the drawings because the particular generator design forms no critical part of the present invention. In the described embodiment, the generator is a DC shunt generator such as generator 23080-013 available from Lucas Aerospace Power Equipment Corporation. However, the field integrity circuit 14 can also be used conveniently with series and compound generators, for example.

Generally, a generator will have the field windings disposed on a stator assembly and the armature windings disposed on the armature rotor. In a generator, when used as a starter, a power source such as a battery (B in FIG. 1) typically is connected to the armature; and also connected by means of a switching device such as a field transistor to the field winding. As a shunt type generator, the field is supplied by the armature through the switching device.

Thus, as shown in FIG. 2, the controller 10 includes the field transistor 28' that is gated on and off by a pulse width modulated (PWM) gate control or drive signal 50. The duty cycle of the PWM gate drive 50 will be a function of the amount of current required by the field in order for the controller to regulate the generator output voltage (POR), as well as to regulate the armature current and generator torque. The control of the PWM gate drive in connection with other functions of the controller 10 will be further explained herein.

For purposes of the field integrity circuit 14 operation, the microcontroller is programmed to strobe the field transistor 28' off momentarily during a time period when the gate drive signal normally has the transistor turned on. For example, during start-up, the gate control signal 50 duty cycle will be 100% (following a torque limiting period which will be explained hereinafter). During such time that the gate drive 50 is on, the microcontroller 12 cyclically strobes the signal off for a short period of time, for example, about 1 millisecond. If the field winding is not open (as in normal operation) a field return current will flow through a free wheeling diode 52 (due to back EMF from the inherent field inductance). If the field is open, no return current will be detected and the microcontroller can cause the start contactor 88 (see FIG. 5) to open, thus terminating the engine start and disconnecting the generator armature from the battery, thereby protecting the starter/generator from potential damage due to an open field winding or connection.

The field integrity monitor function is accomplished in this embodiment with the use of the free wheeling diode 52, such as part no. 03-0064-30 available from Lucas Aerospace Power Equipment Corporation. The free wheeling diode is shunted across the field winding 40. This configuration is also represented in FIG. 1 wherein the diode 52 is connected to the field and field return lines 56,58 of the generator field. The armature voltage that is supplied to the field through the field transistor is designated by the numeral 60 in FIG. 2.

With reference to FIG. 3, the field integrity circuit 14 further includes a differential comparator circuit 62 that detects field return current flow through the free wheeling diode 52 by sensing a positive voltage drop across the diode.

The comparator circuit 62 includes a differential amplifier 64 that is biased with two resistors 66a,b connected to a reference voltage 68 (the reference voltage can be obtained in a conventional manner for example from the generator POR).

The output 16 (labelled OPEN SHUNT in FIG. 1) of the amplifier output is normally logic high due to the presence of a blocking diode 70 and the fact that during operation when the field transistor 28' is turned on, the free wheeling diode is reversed biased by the field voltage. When the transistor 28' is strobed off, if the field integrity is good, current flows through the diode 52 causing the amplifier output to go to a logic low state, and the microcontroller detects the comparator output 16 during the strobe period to verify the field integrity. If the field shunt is open, however, current will not flow through the diode 52, and the comparator output 16 will not change state during the strobe period. This condition is also detected by the microcontroller 12 during the strobe period as an indication of the open shunt, and the start contactor 88 can then be opened.

In addition to checking for an open shunt condition during start-up and steady-state operation of the generator, this field integrity monitor function also will detect generator failures caused by an open field return, absence of field input power (such as from the armature, for example) and a failed (open or shorted) field transistor 28'. For example, if the field transistor is shorted or latched on, current will not flow through the free wheeling diode during the strobe period.

Figure 4:
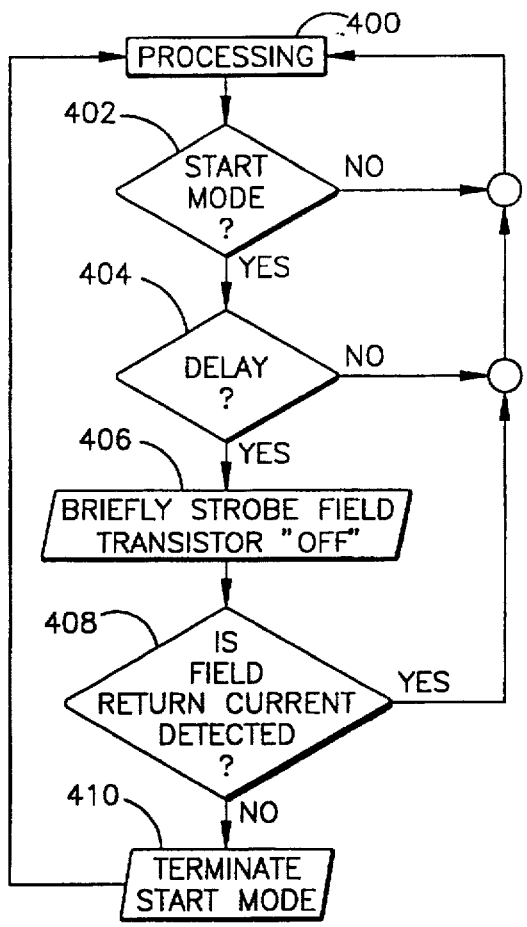
FIG. 4 is a flow diagram of the microprocessor routine for field integrity check.

FIG. 4 is a flow diagram for a suitable microcontroller 12 routine for the field integrity monitor function as implemented through the exemplary circuit of FIGS. 2 and 3. From the main processing routine at step 400, the controller first checks at step 402 whether the generator is in a start-up mode and a torque limiting feature described hereinafter has been completed. These conditions correspond to the gate control signal 50 having a 100% duty cycle. After a suitable delay period at step 404 from the preceding strobe period, the microcontroller 12 strobes the field transistor off at step 406. By choosing a suitable delay period at step 404, this momentary interruption in field drive does not significantly affect the generator starter performance. This field integrity check is performed cyclically throughout the start cycle during which the field transistor is fully on (PWM is 100%).

A particular advantage of using the free wheeling diode for detecting field return current as opposed to a current sense resistor, is that the latter provides a poor signal to noise ratio because the current sense resistance must be small to minimize losses.

Those skilled in the art will appreciate that the field integrity monitor circuit and function can be used independent of other starter/generator control functions described herein such as torque limiting and field weakening.

If field return current is detected, as checked at step 408, then normal operation is continued. If field return current is not detected, then at step 410 the start-up sequence is terminated. The field integrity check is particularly useful during generator start-up to prevent energizing the armature for a long period of time in an open shunt condition, for example. However, the field integrity monitor function can also be used to detect improper generator or control unit 10 (GCU) operation, improper wiring connections and so on.

Figure 5:
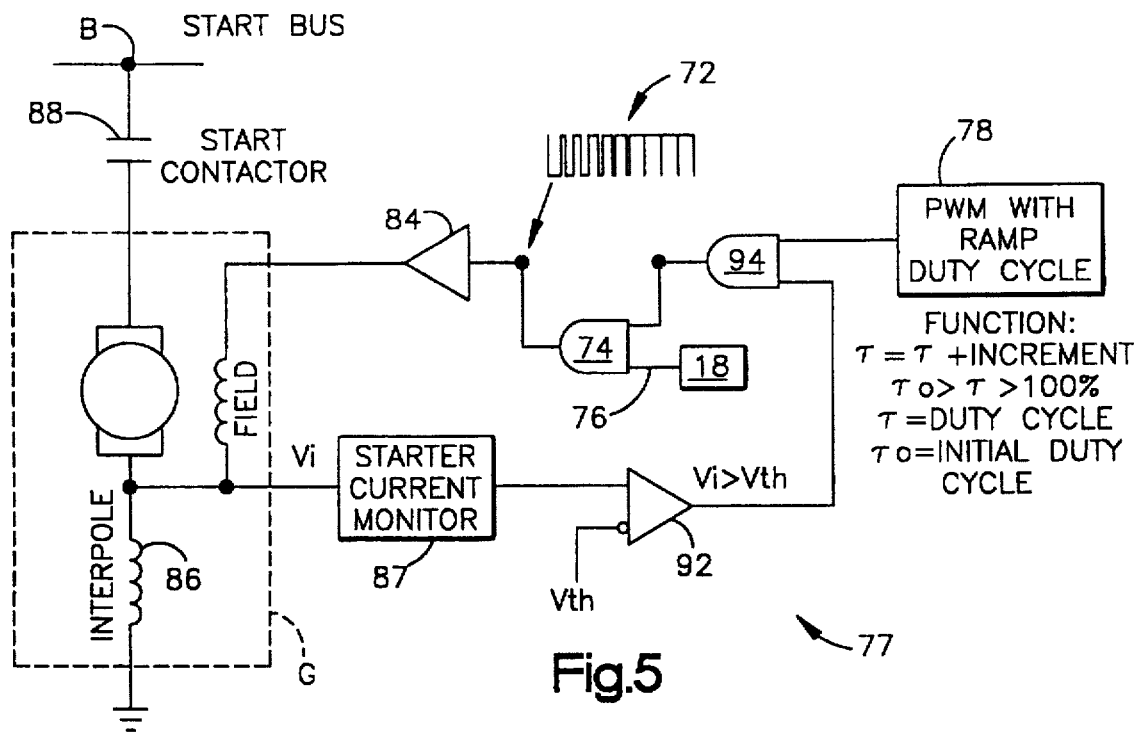
FIG. 5 is a schematic diagram of a torque limiting circuit according to the present invention.

With reference next to FIG. 5, we show a start-up torque limiting circuit 77 that can be used conveniently in conjunction with the voltage regulator circuit 18 of FIG. 1. The basic function of the circuit 77 is to utilize a PWM control signal 72, for the field transistor 28' gate drive, that has a gradually increasing duty cycle from a selected minimum, for example about 25%, to about 100%. This PWM control signal can be produced by the microcontroller 12, for example, and used as an over ride signal 72 (VR INHIBIT in FIG. 1) that is ANDed as at 74 with the regulator output PWM drive signal 76.

At start-up, under normal conditions the duty cycle of the voltage regulator PWM signal 76 will be 100% in order to provide maximum field excitation current. However, this can cause large starting torque which may, for example, stress the engine gearbox. Consequently, the circuit of FIG. 5 is used to limit the starting torque by gradually increasing the field current by means of gradually increasing the duty cycle of the field transistor gate control signal.

In the embodiment of FIG. 5, the microcontroller 12 is programmed to produce a PWM drive signal 78 that has a linearly increasing duty cycle from about 25% to about 100%. By ANDing this signal with the regulator PWM drive signal 76, such as with AND gate 74, the regulator drive signal is temporarily overridden until the duty cycle of the torque limiting signal 72 reaches 100%. Thereafter, the voltage regulator PWM signal can be used to control the field transistor 28'.

Note that in FIG. 5 we show the torque limiting PWM signal 72 as directly feeding the field winding through a functional block 84 (without showing, for example, the field drive transistor that in actual practice would be part of the block 84). We show this configuration because, from an operational standpoint, that is the basic function and effect of the torque limiting signal 72, i.e. to control a gradual increase in the field current. Furthermore, the torque limiting PWM signal 72 does not have to exhibit a linearly increasing duty cycle, and in fact a significant benefit of the microcontroller 12 is that it can be programmed to produce a time variant duty cycle of any desired format depending on the particular application.

In the circuit of FIG. 5, the armature or starter current is sensed from the voltage developed across the interpole winding by a voltage monitor 87 which converts the interpole winding voltage to a digital input to the microcontroller. The torque limiting function is thus de-energized by means of a software gate 94 until closure of the starter contacts 88 (the starter contacts are controlled by the microcontroller in response to actuation of the manual start switch 90 shown in FIG. 1). When the starter contacts 88 close, a comparator (realized in software) 92 detects the initial starter current and thus enables the gate 94 to pass the torque limiting PWM field control signal 72 through to the field transistor. The circuit 92 and the functions 78 and 94 can be realized conveniently in the microcontroller 12 software, if so desired.

Figure 15:
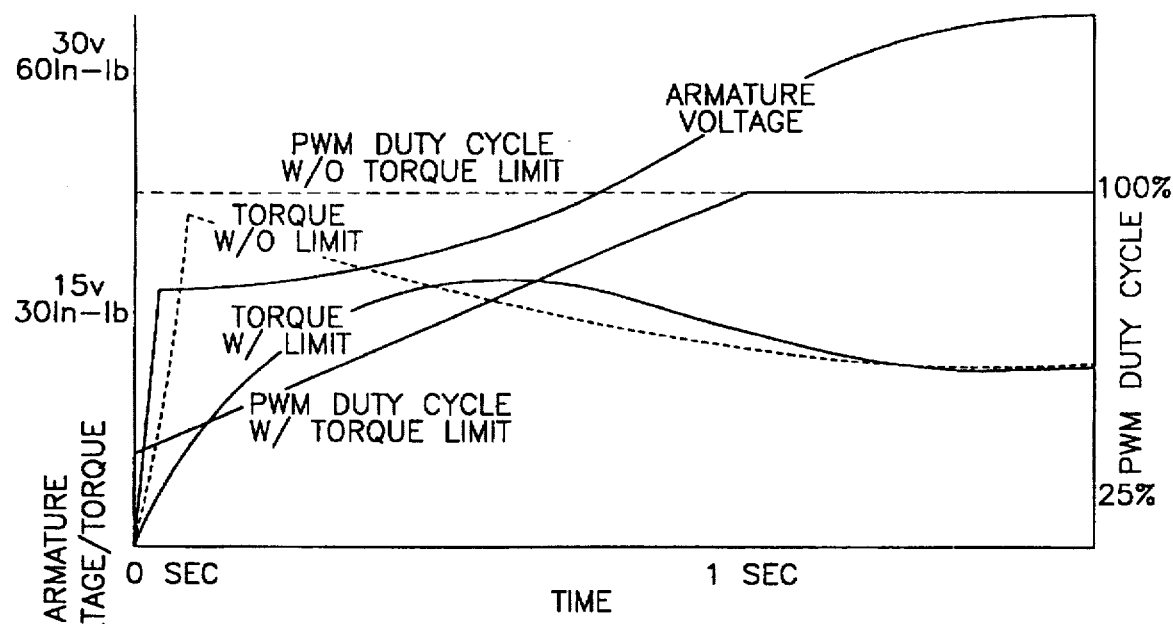
FIG. 15 is a representative graph for certain generator signals during torque limiting according to the invention.

With reference to FIG. 15, we show a graph of representative response curves for starting torque, generator voltage and field current. Note that the torque limiting function according to the invention causes a gradually increasing field current in direct proportion to the generator voltage so as to limit the starting torque.

A concept similar to the starting torque limiting circuit 77 of FIG. 5 is used to implement a field weakening function. During engine start-up, field weakening is used to lower the field current to reduce starter back EMF to thereby increase armature current and torque. Field weakening thus helps maintain starting torque at a desired level.

Figure 6:
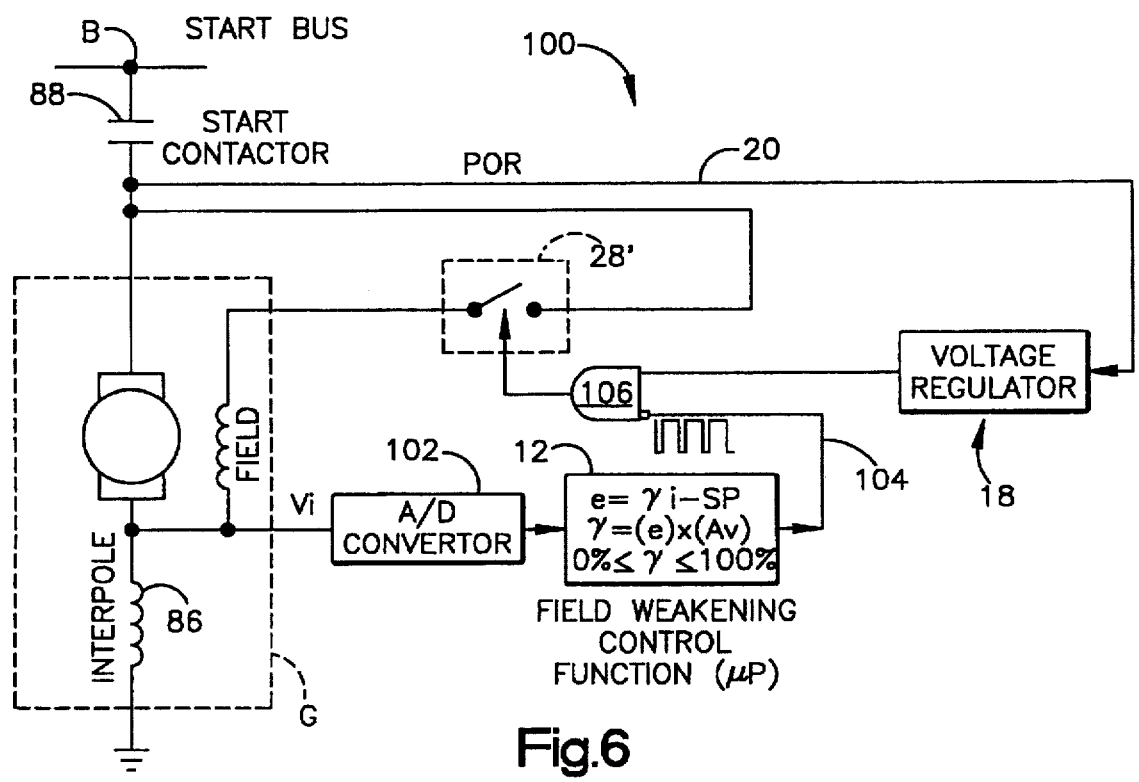
FIG. 6 is a schematic diagram of a field weakening circuit according to the present invention.

With reference to FIG. 6 then, a field weakening circuit in accordance with the present invention is generally designated with the numeral 100. Certain aspects of the circuit 100 are similar to the torque limiting circuit 77, and in fact those skilled in the art will readily appreciate that the two circuits can conveniently be implemented together by selective use of logic circuits such as AND gates. Thus, although some of the circuit components for the circuits of FIGS. 1, 5 and 6 can be the same, we assign different reference designators in the Figures because the individual circuits can be implemented as stand alone circuits, combined as appropriate or omitted as appropriate based on each particular application.

The field weakening circuit 100 monitors the armature current by detecting the voltage drop across the generator interpole winding 86. This voltage ($V_i$ in FIGS. 5 and 6) is then converted to a digital input for the microcontroller 12 using a conventional analog to digital (A/D) converter device 102 (that corresponds to the monitor circuit 87 in FIG. 5. It will be appreciated that the A/D circuit 102 can conveniently be the same as the A/D 24 described with respect to FIG. 1, with the signal INTERPOLE digitally converted in a time multiplexed manner with the other analog input signals 22 as previously described.

The microcontroller 12 uses the armature current input from the interpole winding to develop a PWM control signal 104 ($\gamma$) that is input to an AND gate 106. The AND gate 106 can conveniently be the control AND gate 74 shown in FIG. 1, with the PWM signal $\gamma$ being part of the PWM voltage regulator control signal VR INHIBIT.

The PWM field weakening signal $\gamma$ is ANDed with the output of the voltage regulator 18, which during start-up and normal operating conditions will usually be a PWM signal near 100% duty cycle. Thus, the PWM signal $\gamma$ can be used to control the field excitation and thus armature current and torque according to the programmed field weakening algorithm, which can be any suitable PWM profile adapted for each particular application. As shown in FIG. 6, a suitable algorithm includes calculating an error term $e=V_i-SP$, then multiplying the error signal e by a gain factor Av to arrive at duty cycle gamma, where gamma is limited to between 0% and 100%. Note that $V_i$ is the interpole voltage, SP is a selected setpoint and Av is a gain factor. These parameters are application specific and chosen based on generator rating and aircraft engine characteristics, as will be understood by those skilled in the art.

Note that the field weakening signal $\gamma$ (and thus the microcontroller 12) has control of the field transistor 28' whenever the POR value is below the voltage regulator threshold reference 21 (which causes a logic high output from the regulator 18). However, when the POR value goes above the threshold, the regulator 18 output becomes a PWM signal with a duty cycle based on the regulator control function, and can override the PWM field weakening signal because of the AND function.

In addition to controlling the field excitation during start-up, as with the circuit implementations of FIGS. 5 and 6, the microcontroller can also be used to augment the POR regulation of the voltage regulator circuit 18. Such a control function may be desirable in applications, for example, where small adjustments to the POR voltage are useful such as for load equalization. This added regulation function is accomplished in the described embodiment using a regulator biasing circuit 110 illustrated in FIG. 7 (note that for clarity the implementation of FIG. 7 is partially shown in the system diagram of FIG. 1).

An important consideration when using the microcontroller 12 as part of the generator output voltage (POR) regulation control is that a failure of the digital control logic such as the microcontroller 12 should not be allowed to produce an unsafe condition or override basic regulator functions. Therefore, the circuit of FIG. 7 is particularly advantageous in that it provides a fail-safe biasing approach in which if there is a failure in the microcontroller circuit, the voltage regulator 18 can continue to operate in a normal manner. In general, this is accomplished by implementing a zero bias condition from the microcontroller in the event that the device fails.

Figure 7:
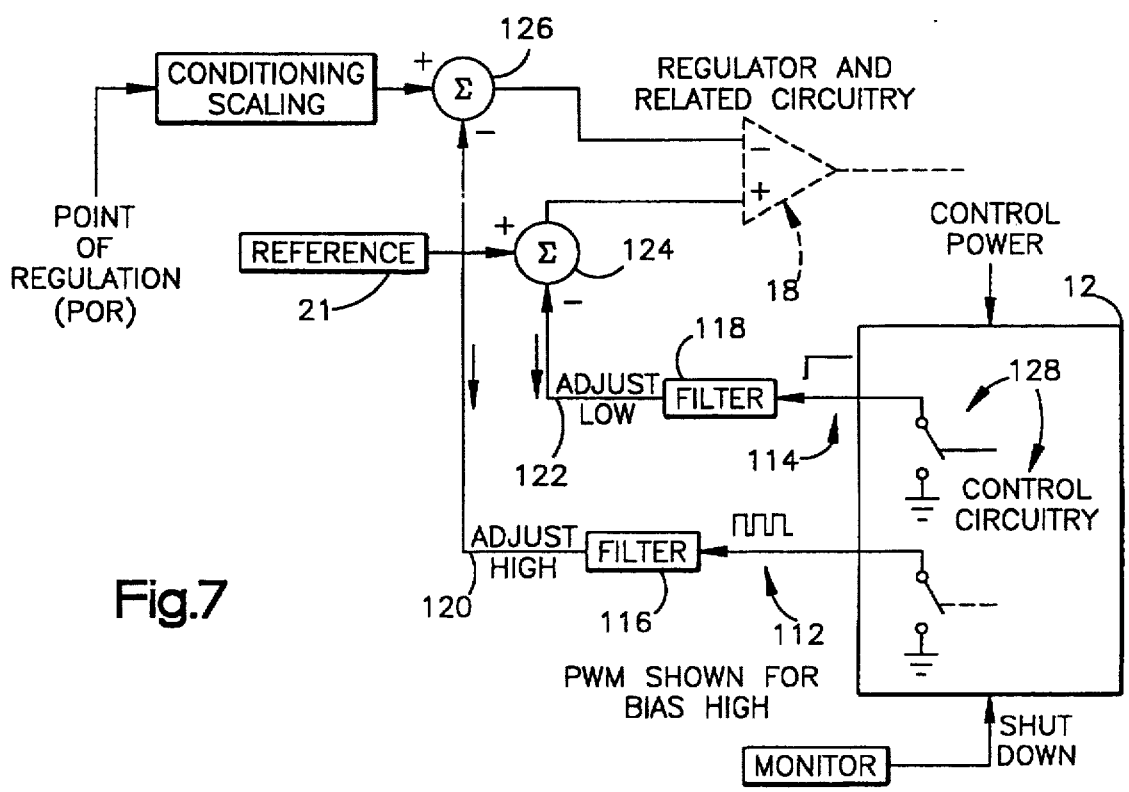
FIG. 7 is a schematic in functional block diagram form of a fail-safe voltage regulator biasing circuit in accordance with the present invention.

In FIG. 7, the microcontroller 12 produces two biasing signals 112 and 114 which respectively are bias high and bias low signals. These bias signals are PWM signals, and each signal is passed through a low pass filter 116,118 (which effectively implement the D/A function 110a in FIG. 1) to produce corresponding DC high and low bias signals 120,122. The bias low signal 122 in this case is summed with the voltage regulator reference signal 21 by a summation circuit 124, and the bias high signal 124 is summed with the POR signal by a summation circuit 126. Note that the summation for the circuits 124 and/or 126 may include an inversion of the bias signal depending on the particular implementation of the biasing scheme. In the described embodiment, the bias low signal is subtracted from the reference signal, and the bias high signal is subtracted from the POR signal, because the POR signal is applied to the inverting input of the voltage regulator 18.

To implement the fail-safe feature, the bias signals are preferably unidirectional signals as represented in FIG. 7, such as can be achieved, for example, by the use of open collector switches 128. In the event of a microcontroller 12 failure, the typical fail mode is such that the PWM signals 112,114 will be the same state. In this case the bias from the adjust low signal is canceled by the signal from the adjust high signal by the common mode rejection of the circuit 18, thus removing any biasing influence of the failed microcontroller 12 from the voltage regulator circuit 18. Consequently, the voltage regulator 18 can continue to regulate the generator output voltage even if the microcontroller 12 fails.

The generator output voltage (POR) regulation function is, of course, an important function for the control unit 10. Discrete control systems used heretofore typically include an overvoltage condition sensing function so that if the generator output voltage exceeds a predetermined threshold the generator is de-energized. Various specifications including government specifications such as MIL-STD-704 and RTCA-DO-160 specify overvoltage protective functions in terms of a voltage/inverse time delay characteristics. This approach limits the time interval during which an overvoltage condition is allowed to exist inversely proportional to its magnitude. In this control scenario, overvoltage conditions are detected for magnitude and time duration, and a common implementation is to time integrate the voltage transients. A problem with conventional control schemes is that the discrete circuits must be able to allow a maximum specified transient but prevent a minimum or higher overvoltage condition. The inherent weakness of this approach is that during a transient that in actuality is an overvoltage condition (i.e. not an acceptable transient), the overvoltage condition is allowed to increase in magnitude until the control circuit time integration determines that in fact it is an overvoltage and not a transient.

Figure 9:
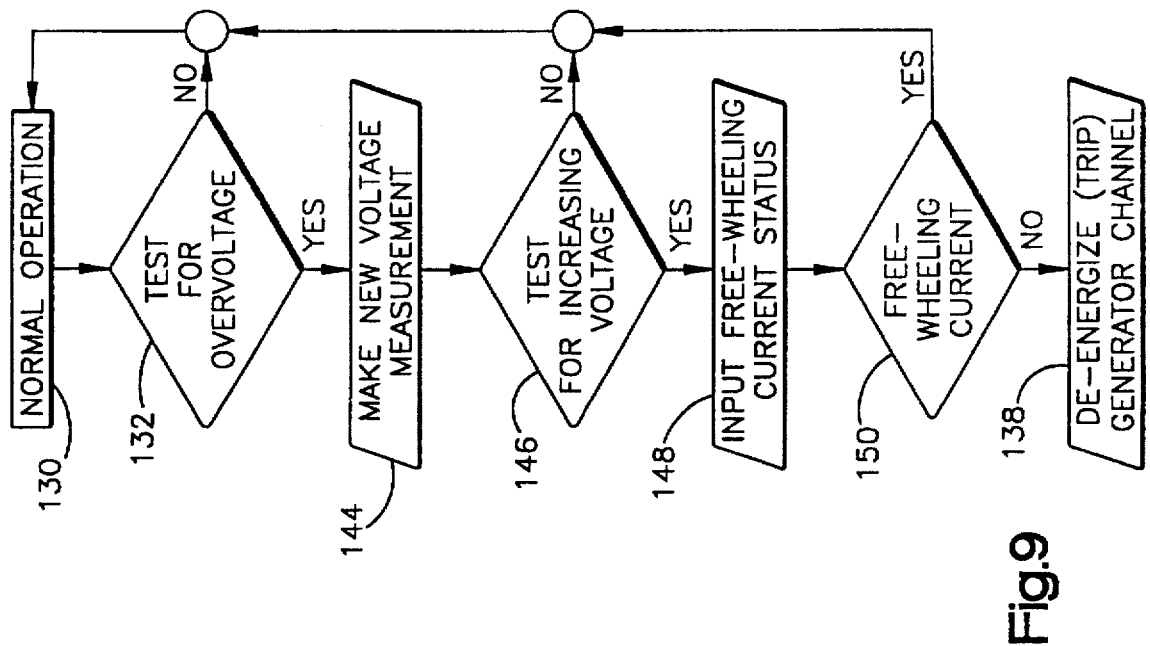
FIGS. 8 and 9 are flow diagrams of an overvoltage protection routing implemented in the microcontroller software for the system of FIG. 1.
Figure 8:
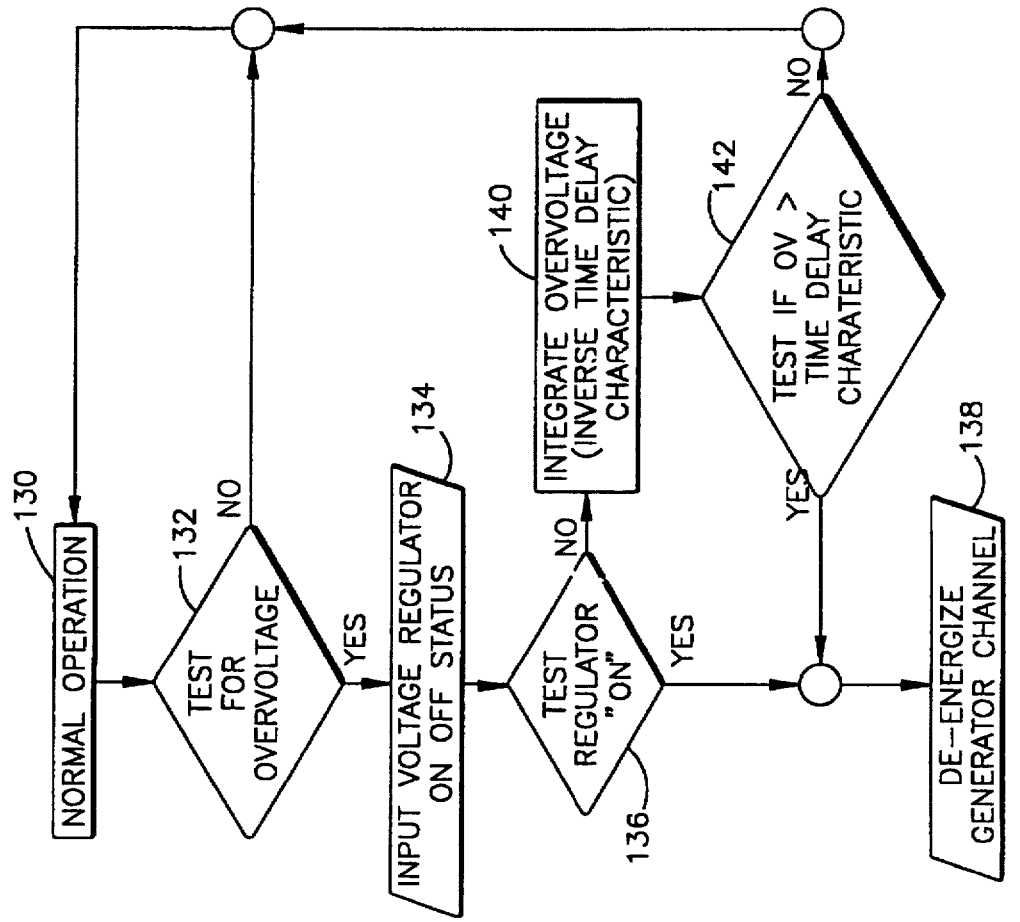

In order to overcome this problem, the microcontroller 12 implements a control routine preferably in software that more quickly identifies or distinguishes an overvoltage condition from a transient. This is realized by monitoring the regulator 18 status and the overvoltage condition concurrently. FIGS. 8 and 9 show a microcontroller routine for the overvoltage protection, with FIG. 8 showing the basic routine and FIG. 9 showing a specific implementation thereof.

Referring to FIG. 8, an overvoltage detection method according to the invention typically starts from a normal operating mode at step 130. If an overvoltage condition is not detected at step 132, normal operation continues. If an overvoltage condition is detected, then at step 134 the controller 12 checks the on/off status of the voltage regulator. If at step 136 the regulator is on during the overvoltage condition then the generator is shut down at step 138. If the regulator is off during the overvoltage condition, then the overvoltage condition is integrated over time at step 140 in a conventional manner. If the overvoltage/inverse time test at step 142 passes, then normal operation resumes because the overvoltage condition was a transient. If the test fails at step 142, then de-energizing occurs.

FIG. 9 shows a specific and preferred implementation or the basic control routine of FIG. 8. In this case, from normal operation at step 130, if an overvoltage condition is detected at step 132, a new voltage measurement is made at step 144 for purposes of checking whether the overvoltage is increasing, as at step 146. If the overvoltage condition is not increasing, normal operation is resumed. If the overvoltage condition is increasing, then at step 148 the microcontroller checks the status of the free wheeling diode 52 (keeping in mind that this current status is an input to the microcontroller 12 via the exemplary circuit of FIG. 3). A properly functioning regulator turns off the field transistor meaning that free wheeling diode current should be present. If current is detected in the free wheeling diode at step 150, then normal operation is resumed. If current is not detected, then the generator is de-energized at step 138.

The free wheeling diode current detection previously described is particularly useful in the overvoltage control routine of FIGS. 8 and 9 because the diode return current is an immediate indication that the voltage regulator for the generator output voltage POR has turned off in response to regulator 18 control. If the regulator is still on, then the likelihood of an overvoltage condition rather than a transient is substantially higher. However, those skilled in the art will appreciate that the overvoltage protection function can be realized with other techniques for detecting the status of the regulator. For example, the on/off status of the field transistor could be detected by the microcontroller 12.

Figure 10:
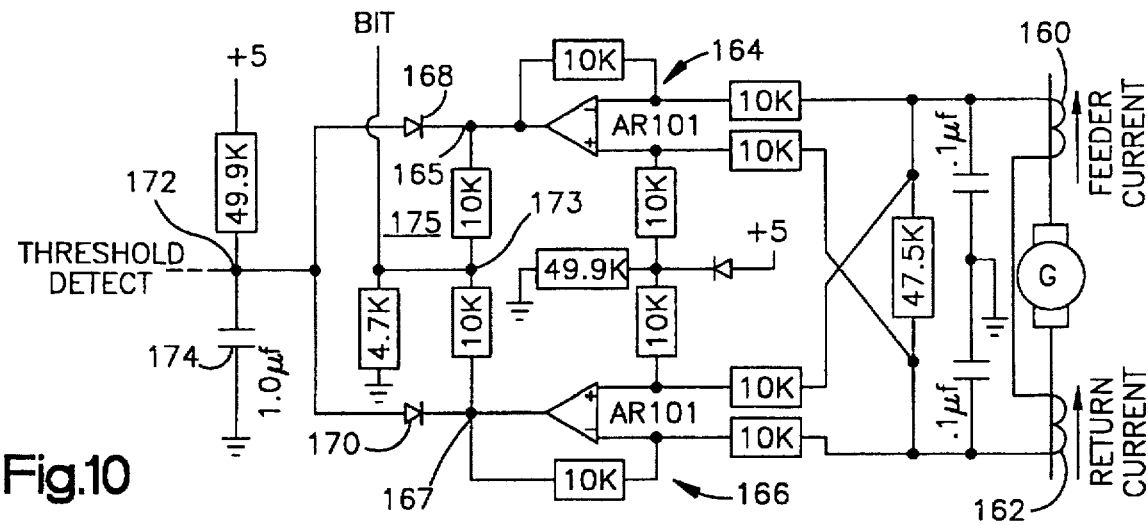
FIG. 10 is a schematic diagram of a differential ground fault detection circuit with built in test capability in accordance with the present invention.

With reference next to FIG. 10, a differential ground fault detection circuit 26 is illustrated. According to an important aspect of the invention, this circuit includes built in test capability that facilitates the use of the microcontroller 12 for ground fault detection.

The ground fault detection circuit 26 monitors the instantaneous difference between the generator G return current and the generator feeder current. These currents are monitored using a pair of current transformers 160,162 which produce a pulse at the occurrence of a fault. The current transformers can each be device no. 50866-000 or GC66available from Lucas Aerospace Power Equipment Corporation, for example.

The pulsed outouts of the current transformers are sensed using a pair of differential amplifier circuits 164,166 which are connected to complement each other. For example, the return current transformer 162 is connected to the inverting input of amplifier 166 and the non-inverting input of amplifier 164. In a complementary manner, the feeder current transformer 160 is connected to the inverting input of the amplifier 164 and the non-inverting input of the amplifier 166. In this manner, the two currents are differentially sensed so that as long as there is no imbalance in the currents, a ground fault is not indicated. The outputs of the amplifiers 164,166 are connected together through respective diodes 168,170 such that if either amplifier output goes low (i.e. negative in the embodiment of FIG. 10), the circuit 26 output signal at node 172 is pulled low. If the outputs of both amplifiers are high, then the output at node 172 of the circuit 26 is a logic high, in this case about 5 volts. A capacitor 174 is used at the output to provide a sample and hold capability for the current transformer pulse. This output is monitored by the microcontroller such as with an A/D converter (see FIG. 1) because the magnitude of the pulse detected at the sample and hold node is proportional to the magnitude of the fault.

Additionally, each of the amplifier outputs 165,167 are connected to a BIT circuit 175 realized with a voltage summing network of resistors 175a,b,c. The output node of the BIT circuit is indicated by the numeral 173.

Thus, under normal operating conditions the output of the circuit 26 will be between +5 volts and zero (for the embodiment of FIG. 10). In this embodiment, the output node 173 of the BIT test circuit is designed to be at a selected value under normal operating conditions of the circuit 26. This value can be selected, for example, as a midpoint of the maximum excursions of the voltage at the BIT node for all circuit failure modes.

If one or the other amplifier circuits 164,166 fails then the output voltage at the BIT node 173 will be biased out of its normal operating limits which condition can be detected by the microcontroller 12. Thus, the circuit 26 contains an built in test capability for the microcontroller to test the circuit 26 based on the output voltage level at the output node 173 without the use of a test stimulus or signal. For example, if the amplifier 164 fails shorted to ground, the voltage at the node 173 will be about one-half its normal value. As another example, if amplifier 164 fails high, then the voltage at the BIT node 173 is twice its normal value.

The output of the circuit 26 is the inverse of the absolute value of the current transformer signals. Differential ground fault sensing in accordance with the invention provides inherent immunity to common mode noise problems typically found in many environments such as aircraft installations. The differential ground fault sensing thus makes the circuit 26 immune from ground level shifts and common mode noise coupling that could otherwise produce false readings in conventional circuits that rely on absolute ground level comparisons.

Figure 11:
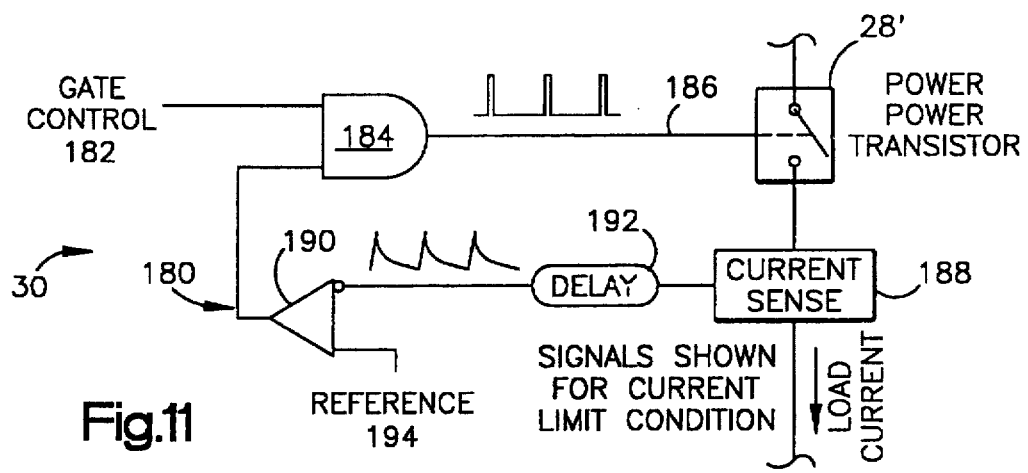
FIG. 11 is a functional block diagram of a driver overload protection circuit in accordance with the present invention.
Figure 12:
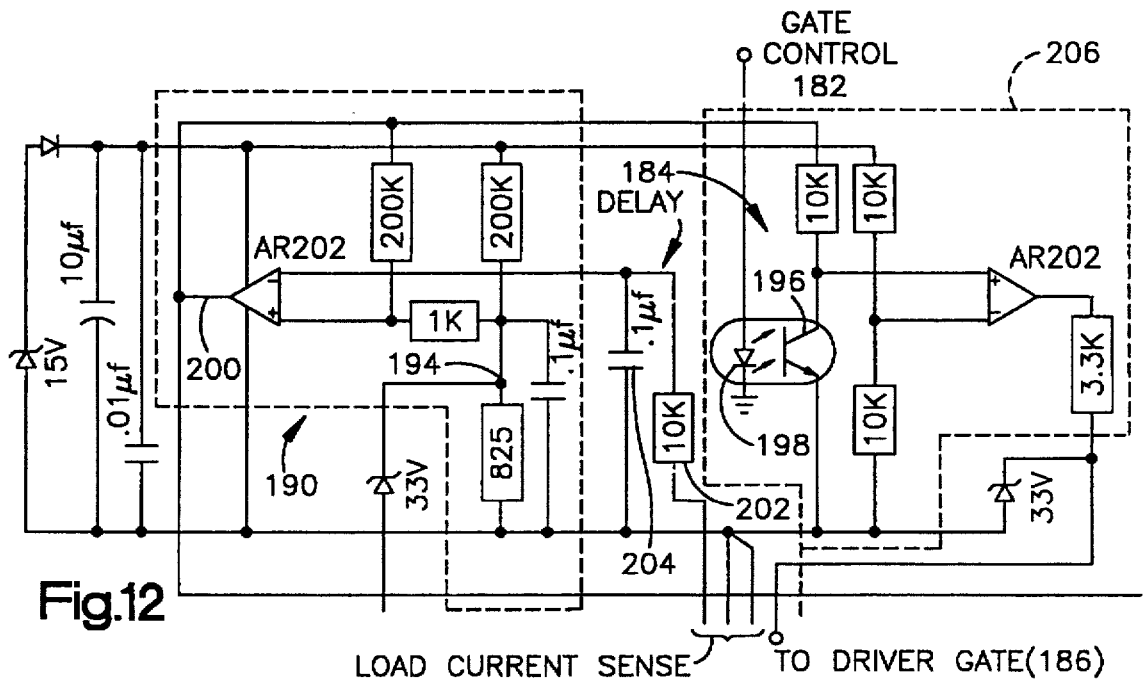
FIG. 12 is a detailed schematic diagram of an embodiment of the circuit in FIG. 11.
Figure 16:
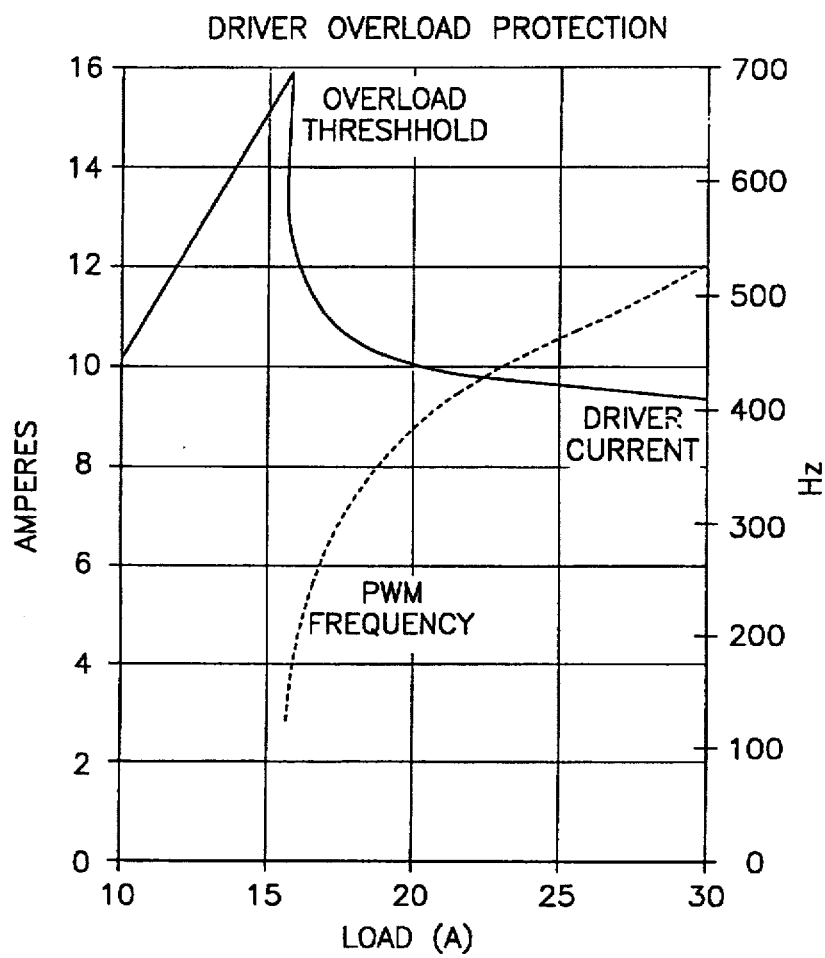
FIG. 16 is a representative graph illustrating our overload feature of the present invention.

As described hereinbefore, the generator control unit 10 can include one or more power switching driver devices, such as the field transistor 28'. With reference to FIGS. 11 and 12, we show an embodiment of a driver overload protection circuit 30 such as can be used with the control unit 10 of FIG. 1. As illustrated in FIG. 11, the protection circuit 30 includes the use of a relaxation oscillator 180 which pulses the control input of the driver transistor with a duty cycle that decreases as output loading increases above a fault threshold determined by a reference value (194). See FIG. 16.

For purposes of explaining the protection circuit 30, we will assume that the driver device being protected is the field transistor 28'. However, those skilled in the art will readily appreciate that the protection circuit 30 can be used in any application for protecting a driver device from an overload condition.

As previously described herein, the field transistor 28' is controlled by means of a PWM gate control signal, 182 which may, for example, include the starting torque limiting and field weakening control features of FIGS. 5 and 6, as well as the basic voltage regulator 18 control feature. The gate control signal 182 is ANDed with a PWM signal 186 from the relaxation oscillator 180, as with AND gate 184. A current sensing circuit 188 of conventional design is used to sense output load current in the device 28'. This overload sensing signal is input to a comparator 190 that includes hysteresis and threshold sensing. A delay circuit 192 delays receipt of the overload signal from the current sensor. If the overload signal, after the delay, exceeds the reference level 194, the comparator trips, turning the device 28' off regardless of the drive signal 182 state. As soon as the overload condition drops below the reference level including the hysteresis value, the comparator resets back again and the gate control signal again takes over control of the device 28'. The OFF pulse time to the device 28' from the comparator 190 will typically be fairly long compared with the duty cycle of the control signal 182 because of the delay function. The hysteresis and delay times can be selected so that the device 28' operates at a preselected current limited operating point. Under such conditions, the comparator 190 will pulse at a fairly constant period, defined primarily by the delay period and the hysteresis set points, as the device 28' operates near the current limit point. The comparator with hysteresis thus operates as a relaxation oscillator. The delay function can be used to insure that the relaxation oscillator does not respond to every minor overload condition, and generally sets the time constant of the circuit 30.

FIG. 12 shows a detailed schematic of one embodiment of the circuit of FIG. 11. In this embodiment, the AND gate 184 is realized by the use of an optocoupler having a phototransistor 196 that is activated by a photodiode 198 responsive to the gate control signal 182. The comparator 190 with hysteresis can be realized with a conventional circuit design as illustrated in FIG. 12. Note that the output of the comparator 190 at node 200 provides the collector drive signal for the phototransistor 196, thus providing an AND function between the gate control signal 182 and the output of the relaxation oscillator. The delay function 192 can be realized conveniently by the use of an RC time constant established by a resistor 202 and capacitor 204.

An amplifier 206 configured as a conventional comparator thus produces the PWM gate drive signal to the field transistor 28'.

Figure 13:
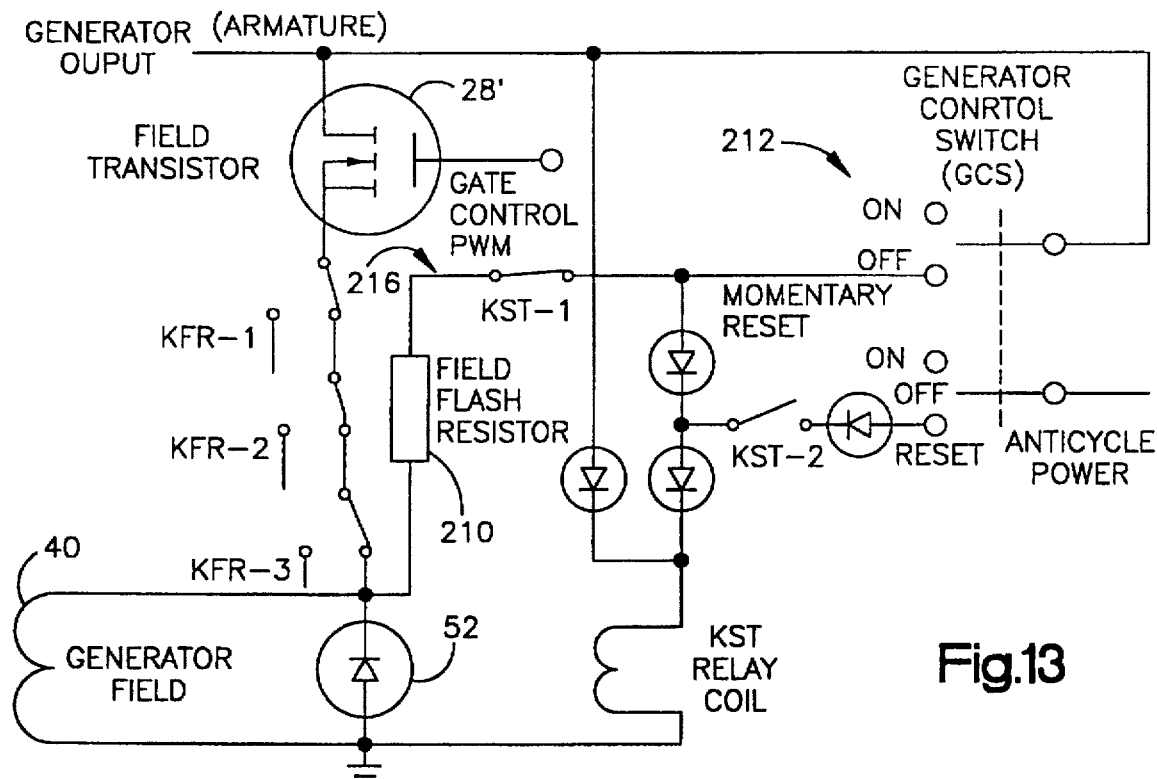
FIG. 13 is a conventional field flash circuit.

With reference next to FIG. 13, we show a conventional field flash circuit. As those skilled in the art understand, field flash refers to the operation in which a generator can be started using the residual voltage of the generator without the use of an independent voltage supply to the armature. This residual voltage typically is a minimum of 0.5 volts DC for a standard aircraft starter/generator. In the conventional design, a field flash resistor 210 is connected between the field winding 40 and a contact 212 of a generator control switch GCS through a starter relay contacts 216 (KST-1). The KST relay is closed when the generator is deenergized and opened when the generator is energized by the armature voltage. Energizing the KST relay opens the field flash path. In conventional field flash operation, the GCS switch must be manually actuated by the pilot even when the field relay KFR is in the reset position as represented in FIG. 13 and only minimal residual voltage is available. In other words, the field flash path must be through the GCS switch.

Figure 14:
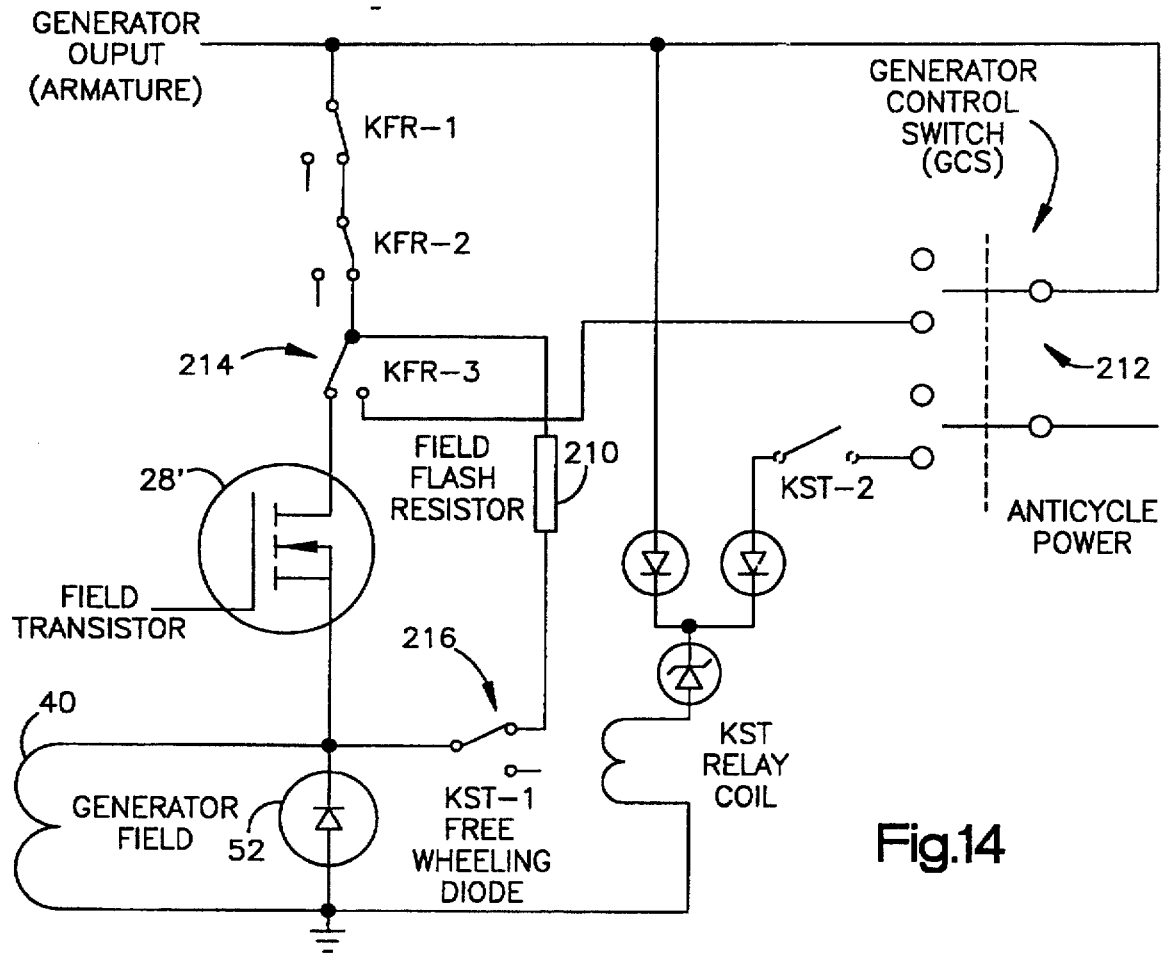
FIG. 14 is a field flash circuit according to the present invention.

In accordance with the present invention, as illustrated in FIG. 14, the field flash resistor is connected between the field relay contacts 214 and the field winding 40 so that the KFR contacts are used to select the source of field flash current. When the KFR is in the trip position (FIG. 14 shows the reset position for the KFR relay, the de-energized position for the KST relay and the off position for the GCS), the field flash path is selected through the GCS switch as in the conventional arrangement. When the KFR is in the reset position, the field flash path is selected to be from the armature. In this manner, field flash can automatically occur without the pilot having to manually toggle the GCS relay switch when the KFR is reset which is the normal mode of operation.

The invention thus provides a microprocessor based generator control unit 10 that can control and monitor various generator start-up functions and regulation functions with greater responsiveness and control than previously realized.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

We claim:

1. A switching driver device overload protection circuit, comprising: drive means for controlling current through the device to a load, means for detecting load current and for producing an overload signal when the load current reaches a threshold; and a relaxation oscillator for limiting said current through the device in response to said overload signal.

2. The circuit of claim 1 wherein the device is a field current transistor for a generator, said transistor operating with a pulse width modulated gate drive signal, said relaxation oscillator changing the gate drive signal duty cycle in response to load current through the device.

3. The circuit of claim 1 wherein said device comprises a gate controlled switching transistor, and said drive means comprises a circuit for applying a pulse width modulated (PWM) gate control signal to said transistor at a duty cycle based in part on the current load on the device.

4. The circuit of claim 3 wherein said relaxation oscillator disables said PWM gate control signal when load current through the device reaches a threshold.

5. The circuit of claim 4 wherein said means for detecting load current comprises a precision resistor in series with the device and the load so that voltage drop across said resistor corresponds to said load current.

6. The circuit of claim 5 wherein said relaxation oscillator comprises a comparator with hysteresis, said comparator having an output that switches state when said overload signal indicates an overload condition.

7. The circuit of claim 4 wherein the relaxation oscillator periodically disables said drive means in order to limit load current through the device.

8. The circuit of claim 7 comprising a delay circuit for delaying said overload signal to said relaxation oscillator so that said oscillator disables said drive means over a generally constant period.

9. The circuit of claim 8 wherein said delay circuit exhibits an RC time constant that determines the relaxation oscillator disable time of said drive means.

10. The circuit of claim 9 wherein said delay circuit comprises a resistor and capacitor filter circuit that filters short duration overload conditions from being input to the relaxation oscillator.

11. The circuit of claim 7 wherein said relaxation oscillator disables said drive means for a time period that is long compared to the duty cycle of said drive means.

12. A switching driver device overload protection circuit, comprising: drive means for controlling current through the device to a load by applying a pulse width modulated (PWM) control signal to the device, and a current limiting circuit for limiting said current through the device in response to increasing load by disabling said PWM signal.

13. The circuit of claim 12 wherein said current limiting circuit periodically disables said PWM signal to limit current through the device based on load applied to the device.

14. The circuit of claim 12 wherein said current limiting circuit comprises a relaxation oscillator that periodically disables said PWM signal to limit current through the device based on load applied to the device.

15. The circuit of claim 12 comprising detector means for detecting load current.

16. The circuit of claim 15 wherein said detector means produces an output that indicates a current overload condition based on the load current exceeding a threshold and which is used as a control signal for said current limiting circuit.

17. The circuit of claim 16 wherein said current limiting circuit comprises a relaxation oscillator and said detector means comprises a precision resistor in series with the device and the load.

18. A switching driver device overload protection circuit, comprising: drive means for controlling current through the device to a load, detector means for detecting load current and producing an overload signal when the load current reaches a threshold, and a current limiting circuit for limiting current through the device in response to increasing load by disabling said drive means.

* * * * *